United States Patent
Takahashi

[11] Patent Number: 5,891,276
[45] Date of Patent: Apr. 6, 1999

[54] PNEUMATIC TIRE FOR HEAVY DUTY INCLUDING NARROW BLOCK

[75] Inventor: Osamu Takahashi, Hiratsuka, Japan

[73] Assignee: The Yokohama Rubber Co., Ltd., Tokyo, Japan

[21] Appl. No.: 958,093

[22] Filed: Oct. 27, 1997

[30] Foreign Application Priority Data

Oct. 28, 1996 [JP] Japan .................................. 8-285118

[51] Int. Cl.$^6$ .......................... B60C 11/03; B60C 107/00
[52] U.S. Cl. ...................................................... 152/209 R
[58] Field of Search ............................. 152/209 R, 209 D

[56] References Cited

U.S. PATENT DOCUMENTS

| | | | |
|---|---|---|---|
| 4,722,378 | 2/1988 | Carolla et al. | 152/209 R |
| 5,323,825 | 6/1994 | Yamagishi et al. | 152/209 R |
| 5,361,815 | 11/1994 | Loser et al. | 152/209 R |
| 5,571,351 | 11/1996 | Hatakenaka et al. | 152/209 R |
| 5,580,404 | 12/1996 | Hitzky | 152/209 R |
| 5,690,761 | 11/1997 | Masaoka | 152/209 R |

FOREIGN PATENT DOCUMENTS

| | | | |
|---|---|---|---|
| 2080328 | 4/1993 | Canada | 152/209 D |
| 4-81307 | 3/1992 | Japan | 152/209 R |
| 4-154409 | 5/1992 | Japan | 152/209 R |
| 4-176712 | 6/1992 | Japan | 152/209 R |
| 8-72508 | 3/1996 | Japan . | |
| 1549347 | 8/1979 | United Kingdom | 152/209 R |

*Primary Examiner*—Steven D. Maki
*Attorney, Agent, or Firm*—Nikaido, Marmelstein, Murray & Oram LLP

[57] ABSTRACT

A heavy duty pneumatic tire comprising a plurality of block rows provided on a tread surface, each block row being composed of a plurality of blocks formed by a plurality of main grooves extending in a tire circumferential direction and a plurality of lateral grooves intersecting said main grooves, wherein a narrow block is provided, interposing a sub groove, in a position outside each block of block rows adjacent to an inner side of an outermost main groove in a tire width direction; and wherein a surface of said narrow block is formed to be circular-arc by setting a height of a center part of said narrow block surface in the tire circumferential direction to be equal to that of said tread surface and a height of both end parts of said narrow block surface to be lower than that of said tread surface by 1.5 to 2.5 mm.

8 Claims, 1 Drawing Sheet

PNEUMATIC TIRE FOR HEAVY DUTY INCLUDING NARROW BLOCK

BACKGROUND OF THE INVENTION

The present invention relates to a heavy duty pneumatic tire having a block pattern, and more particularly a heavy duty pneumatic tire capable of suppressing railway wear and reducing heel-and-toe wear.

A heavy duty pneumatic tire employs a block pattern having a plurality of block rows in a tread surface composed of a plurality of main grooves extending in a tire circumferential direction and a number of lateral grooves intersecting these main grooves. It is known that in the heavy duty pneumatic tire having such a block pattern, an increase in a running distance produces uneven wear called heel-and-toe wear in which a trailing edge wear of each block of block rows arranged in the center side of a rib or a block of a shoulder area is greater than its leading edge wear. Also, uneven wear called railway wear may occur, in which the outer portion of each block in a tire width direction, arranged inside the shoulder area, is unevenly worn away.

For countermeasures to prevent the foregoing railway wear, for example, as is disclosed in Japanese patent application Kokai publication No. 8-72508, a narrow block is provided in a position outside each block being composed of the block rows inside of the shoulder area in a tire width direction with interposing a sub groove. This countermeasure has been effective for reducing railway wear, but has proven to be ineffective for reducing heel-and-toe wear.

SUMMARY OF THE INVENTION

It is an object of the present invention to provide a heavy duty pneumatic tire capable of suppressing railway wear and reducing heel-and-toe wear.

In order to achieve the objective, according to the present invention, there is provided the heavy duty pneumatic tire which comprises a plurality of block rows on a tread surface, each row being composed of plurality of blocks formed by a plurality of main grooves extending in a tire circumferential direction and a number of lateral grooves intersecting these main grooves. In this heavy duty pneumatic tire, a narrow block is provided by interposing a sub groove in a position outside each block of block rows which is adjacent to an inner side of an outermost main groove in a tire width direction, and a surface of a narrow block is formed to be circular-arc by setting a height of a center part of the surface thereof in the tire circumferential direction to be equal to that of the tread surface and heights of both end parts thereof to be lower than that of the tread surface by 1.5 to 2.5 mm.

With the foregoing heavy duty pneumatic tire, since the narrow block is provided by interposing the sub groove in the position outside each block of the block rows which is adjacent to the inner side of the outermost main groove in the tire width direction, the railway wear in the block side can be suppressed by sacrificing the wear of the narrow block. In addition, since the surface of the narrow block is formed to be circular-arc by setting the height of the center part of the surface thereof in the tire circumferential direction to be equal to that of the tread surface and the height of both end parts of the block surface to be lower than that of the tread surface by 1.5 to 2.5 mm, the slippage in each block against a road surface is reduced and thus heel-and-toe wear can be reduced.

Furthermore, even when the narrow block is worn away due to the progress of wear in the tread surface, the narrow block is worn away while keeping the circular-arc shape of its surface at the time of being a new product and thus no change in the shape of the surface occurs. Accordingly, its appearance may not be damaged.

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
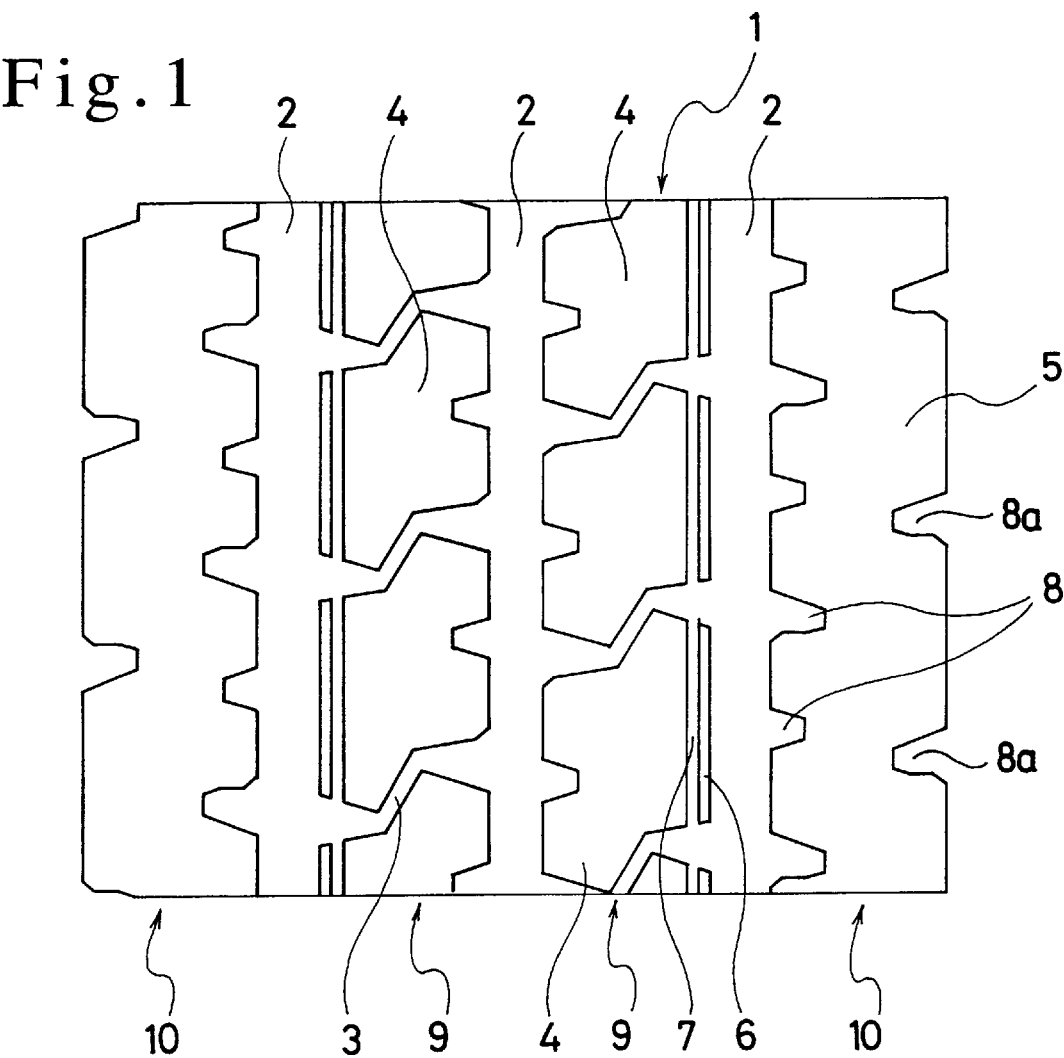
FIG. 1 is a plan view showing a tread pattern of a heavy duty pneumatic tire of the present invention.

FIG. 1 shows one example of a tread pattern of a pneumatic tire of the present invention. Referring to FIG. 1, on a tread surface 1, arranged are three main grooves 2, 2 and 2 extending in a tire circumferential direction and a number of lateral grooves 3 intersecting these main grooves 2, 2 and 2. Two block rows 9 and 9 are formed by these main grooves 2, 2 and 2 and the lateral grooves 3 in a center area. Ribs 10 and 10 having a plurality of notched areas 8 and 8a in both side parts thereof are formed in both shoulder areas. Both shoulder areas need not always include ribs 10. The ribs of the shoulder areas may be replaced by block rows.

Figure 2:
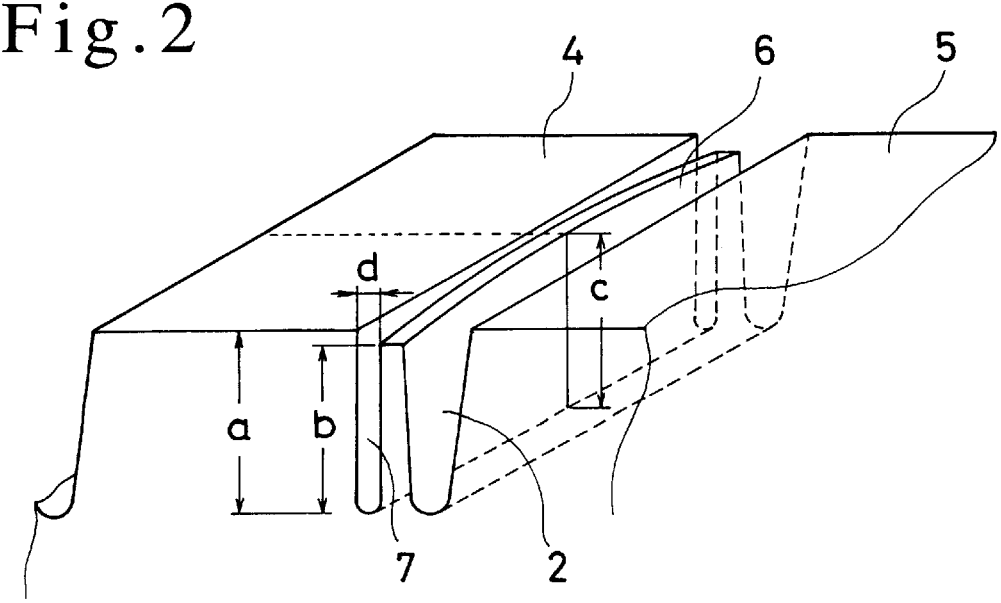
FIG. 2 is an expanded perspective view showing main sections of a block of FIG. 1 and a narrow block.

A narrow block 6 is arranged in a position outside each block 4 in a tire width direction by interposing a sub groove 7, each block 4 constituting each of the block rows 9 and 9. As shown in FIG. 2, the entire upper surface of the block 4 has a height equal to the height a of the tread surface 1, and the surface of the narrow block 6 is formed to be circular-arc by setting the height c of the center part of the block surface in the tire circumferential direction to be equal to the height a of the tread surface 1 and the height b of each of both end parts of the block surface in the tire circumferential direction to be lower than the height a of the tread surface 1 by 1.5 to 2.5 mm.

According to the heavy duty pneumatic tire of the present invention constructed in the above-described manner, the narrow block 6 is arranged by interposing the sub groove 7 in the position outside of each block 4 in the block row 9 which is adjacent to the inner side of the outermost main groove 2 in the tire width direction, and the wear of this narrow block 6 is sacrificed, whereby the railway wear of the block 4 can be suppressed.

Since the surface of the narrow block 6 is formed to be circular-arc by setting the height of the center part of the block surface in the tire circumferential direction to be equal to that of the tread surface 1 and the height of both end parts of the block surface to be lower than that of the tread surface 1 by 1.5 to 2.5 mm, the slippage in each block 4 against the road surface is reduced and thus heel-and-toe wear can be reduced.

Furthermore, with the heavy duty pneumatic tire of the present invention, since the surface of the narrow block 6 is formed to be circular-arc from the time of its being a new product, the same surface shape can be maintained after the tire is worn away, and thus no damage is given to its appearance.

According to the present invention, the height b of each of both end parts of the narrow block 6 must be set to be lower than the height a of the tread surface 1 by 1.5 to 2.5 mm. By setting the height b of each of both end parts of the narrow block 6 to be lower than the height a of the tread surface 1, the height of the block 4 compressed at the time of tire contacting agrees approximately with the height b of each of both end parts of the narrow block 6 and thus the slippage of the block 4 against the road surface can be reduced. If a difference between the height b of each of both end parts of the narrow block 6 and the height a of the tread surface 1 is smaller than 1.5 mm, the narrow block 6 is apt to be buckled when deformation occurs in the block 4 at the time of contacting. Consequently, uneven wear cannot be reduced. Conversely, if the difference in height exceeds 2.5 mm, both end parts of the narrow block 6 in a circumferential direction are not contacted when deformation occurs in the block 4 at the time of contacting. Consequently, uneven wear cannot be prevented.

A width of the narrow block 6 should preferably be set to one within a range of 3 to 8 mm. If the width of the narrow block 6 is smaller than 3 mm, since the block 6 is apt to be buckled upon a heavy loading, uneven wear cannot be reduced. Conversely, if the width exceeds 8 mm, since the main groove 2 is clogged by the narrow block 6, the water discharging effect of the main groove 2 is reduced and stone retention easily occurs.

Furthermore, the width d of the sub groove 7 should preferably be set to one within a range of 1 to 4 mm. Even if the width d of the sub groove 7 is set to be smaller than 1 mm, heel-and-toe wear can still be suppressed. However, this setting is not practical because a sipe must be reinforced from the point of view of metallic mold working resulting in an increase in manufacturing cost. On the other hand, if the width d of the sub groove 7 exceeds 4 mm, other problems such as stone retention may occur in the main grooves 2, 2 and 2 adjacent to the sub groove 7. A depth of the sub groove 7 should preferably set to one within a range of 0.7 to 1.0 times the depth of the main groove 2.

Embodiments

Assuming that a tire size was 295/75R22.5 14PR, a tread pattern was one shown in FIG. 1, a block average length in a circumferential direction was 22 mm and a main groove depth a was 22.2 mm, we made a conventional tire 2 in which a height of a surface of a narrow block was set to be equal to that of a tread surface, a conventional tire 3 in which the surface height of a narrow block was set to be lower than that of a tread surface by 2.0 mm and a tire according to the present invention in which a surface of a narrow block was formed to be circular-arc by setting the height of the center part of the block surface in a tire circumferential direction to be equal to the height of a tread surface and the height of both end parts of the block surface to be lower than that of the tread surface by 2.0 mm. We also made a conventional tire 1 which was different from the tire of the present invention only in that no narrow blocks were provided. For these tires, Table 1 shows main groove depths a, the heights b of both end parts of the narrow blocks and the heights c, (a-b) and (a-c) of the center parts of these blocks.

TABLE 1

(unit: mm)

|  | a | b | c | a − b | a − c |
|---|---|---|---|---|---|
| Conventional tire 1 | 22.2 | — | — | — | — |
| Conventional tire 2 | 22.2 | 22.2 | 22.2 | 0 | 0 |

TABLE 1-continued (unit: mm)

|  | a | b | c | a − b | a − c |
|---|---|---|---|---|---|
| Conventional tire 3 | 22.2 | 20.2 | 20.2 | 2.0 | 2.0 |
| Tire of the invention | 22.2 | 20.2 | 22.2 | 2.0 | 0 |

For the tires of these four kinds, we measured changes in dimensions a, b and c by using the following tire wear testing method and evaluated the amount of heel-and-toe wear (H/T amount) and the changing amounts of (a-b) and (a-c). The results are shown in Tables 2 and 3.

Tire Wear Testing Method

We set a tire to be tested to the drive axle of the tractor of an axle configuration 2-D·D and measured respective dimensions (unit: mm) a, b and c after 10,000 km running. Also, we measured the amount of wear for each of the leading and trailing edges of the block from the time of its being a new product after running. We evaluated a difference in wear between the leading edge and the trailing edge as the amount of heel-and-toe wear (H/T amount). It can be understood that as the numerical value of a H/T amount is smaller, the occurrence of heel-and-toe wear is smaller.

TABLE 2

(unit: mm)

|  | a | b | c | a − b | c − b | H/T amount |
|---|---|---|---|---|---|---|
| Conventional tire 1 | 19.3 | — | — | — | — | 2.9 |
| Conventional tire 2 | 20.6 | 19.0 | 21.2 | 1.6 | 2.2 | 1.6 |
| Conventional tire 3 | 20.6 | 19.0 | 20.0 | 1.6 | 1.0 | 1.6 |
| Tire of the invention | 20.9 | 19.1 | 21.1 | 1.8 | 2.0 | 1.3 |

TABLE 3

(unit: mm)

|  | Changing amount of (a − b) | Changing amount of (c − b) |
|---|---|---|
| Conventional tire 2 | −1.6 | −2.2 |
| Conventional tire 3 | −0.4 | −1.0 |
| Tire of the invention | −0.2 | 0 |

It can be understood from the result of Table 2 that a H/T amount is small for the tire of the present invention compared with those for the conventional tires 1, 2 and 3 and thus the amount of heel-and-toe wear is small.

It can also be understood from the result of Table 3 that the changing amounts of (a-b) and (c-b) are small for the tire of the present invention compared with those for the conventional tires 2 and 3 and thus a change in the shape of the narrow block between the time of being a new product and the time of wear is small.

Although the preferred embodiment of the present invention has been described in detail, it should be understood that various changes, substitutions and alternations can be made therein without departing from spirit and scope of the inventions as defined by the appended claims.

What is claimed is:

1. A heavy duty pneumatic tire comprising a plurality of block rows provided on a tread surface, each block row being composed of a plurality of blocks formed by a plurality of main grooves extending in a tire circumferential direction and a plurality of lateral grooves intersecting said main grooves, wherein a narrow block is provided in a position outside each block of the block rows and adjacent to an inner side of an outermost main groove in a tire width direction; and wherein a sub groove is provided between the narrow block and the block of the block rows; and wherein the entire upper surface of the block of the block rows has a height equal to a height of the tread surface; and wherein a surface of said narrow block is formed to be a circular-arc by setting a height of a center part of said narrow block surface in the tire circumferential direction to be equal to the height of said tread surface and a height of both end parts of said narrow block surface to be lower than said height of said tread surface by 1.5 to 2.5 mm.

2. A heavy duty pneumatic tire according to claim 1, wherein a rib is provided in a position outside said outermost main groove on the tread surface in the tire width direction.

3. A heavy duty pneumatic tire according to claim 2, wherein a width of said narrow block is set to a value selected from a range of 3 to 8 mm.

4. A heavy duty pneumatic tire according to claim 3, wherein a width of said sub groove is set a value selected from a range of 1 to 4 mm.

5. A heavy duty pneumatic tire according to claim 2, wherein a width of said sub groove is set to a value selected from a range of 1 to 4 mm.

6. A heavy duty pneumatic tire according to claim 1, wherein a width of said narrow block is set to a value selected from a range of 3 to 8 mm.

7. A heavy duty pneumatic tire according to claim 6, wherein a width of said sub groove is set to a value selected from a range of 1 to 4 mm.

8. A heavy duty pneumatic tire according to claim 1, wherein a width of said sub groove is set to a value selected from a range of 1 to 4 mm.

* * * * *